US011195106B2

(12) United States Patent
Guo et al.

(10) Patent No.: US 11,195,106 B2
(45) Date of Patent: Dec. 7, 2021

(54) SYSTEMS AND METHODS FOR SCRAPING URLS BASED ON VIEWPORT VIEWS

(71) Applicant: Facebook, Inc., Menlo Park, CA (US)

(72) Inventors: Shengbo Guo, San Jose, CA (US); Mark Warren McDuff, Seattle, WA (US); Yixian Zhu, Menlo Park, CA (US); Ying Zhang, Palo Alto, CA (US); James Li, Pleasanton, CA (US); Sara Lee Su, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 997 days.

(21) Appl. No.: 15/636,390

(22) Filed: Jun. 28, 2017

(65) Prior Publication Data

US 2019/0005393 A1    Jan. 3, 2019

(51) Int. Cl.
*G06N 5/04*    (2006.01)
*G06N 20/00*    (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 9,462,313 B1 * | 10/2016 | Sbaiz | H04N 21/25891 |
| 9,959,563 B1 * | 5/2018 | Wu | G06Q 30/0631 |
| 10,269,044 B2 * | 4/2019 | Mazumdar | G06Q 30/0201 |
| 2004/0172374 A1 * | 9/2004 | Forman | G06N 20/00 706/12 |
| 2010/0217665 A1 * | 8/2010 | Sharma | G06Q 30/0271 705/14.45 |
| 2011/0112981 A1 * | 5/2011 | Park | G06Q 30/0282 705/347 |
| 2011/0191190 A1 * | 8/2011 | Heller | H04N 21/812 705/14.68 |
| 2013/0073632 A1 | 3/2013 | Fedorov | |
| 2013/0091128 A1 * | 4/2013 | Radinsky | G06F 16/17 707/723 |
| 2014/0244361 A1 * | 8/2014 | Zhang | G06Q 30/0204 705/7.33 |
| 2015/0350149 A1 * | 12/2015 | Acharya | H04L 51/32 709/206 |
| 2015/0372891 A1 * | 12/2015 | Appleby | G06Q 30/08 709/224 |
| 2017/0061235 A1 * | 3/2017 | Frey | G06K 9/4628 |

(Continued)

OTHER PUBLICATIONS

Arapakis, "On the Feasibility of Predicting Popular News at Cold Start", Dec. 21, 2016 in Wiley Online Library (wileyonlinelibrary.com), 1150-1164 (Year: 2016).*

(Continued)

*Primary Examiner* — Michael J Huntley
*Assistant Examiner* — Imad Kassim
(74) *Attorney, Agent, or Firm* — Sheppard Mullin Richter & Hampton LLP

(57) ABSTRACT

Systems, methods, and non-transitory computer readable media are configured to receive a uniform resource locator. A time and one or more features associated with the uniform resource locator can be provided to a first machine learning model. A prediction relating to a quantity of views the uniform resource locator achieves by the time can be received from the first machine learning model.

20 Claims, 7 Drawing Sheets

(56) References Cited

U.S. PATENT DOCUMENTS

| | | | | |
|---|---|---|---|---|
| 2017/0061500 A1* | 3/2017 | Borodin | ............. | G06N 20/00 |
| 2017/0366626 A1* | 12/2017 | Wang | ............. | H04L 67/025 |
| 2018/0004497 A1* | 1/2018 | Ramachandran | ... | G06F 11/3438 |
| 2018/0047071 A1* | 2/2018 | Hsu | ............. | G06Q 30/0282 |
| 2018/0174070 A1* | 6/2018 | Hoffman | ............. | G06N 7/005 |
| 2018/0268073 A1* | 9/2018 | Wang | ............. | H04L 67/22 |
| 2018/0357595 A1* | 12/2018 | Rai | ............. | G06Q 30/0205 |

OTHER PUBLICATIONS

McParlane, ""Nobody comes here anymore, it's too crowded"; Predicting Image Popularity on Flickr", ACM ICMR 2014 (Year: 2014).*

Zhang, "Collective Bayesian Poisson Factorization Model for Cold-start Local Event Recommendation", 2015 ACM (Year: 2015).*

Schein, "Methods and Metrics for Cold-Start Recommendations", SIGIR'02, Aug. 11-15, 2002, pp. 253-260 (Year: 2002).*

* cited by examiner

SYSTEMS AND METHODS FOR SCRAPING URLS BASED ON VIEWPORT VIEWS

FIELD OF THE INVENTION

The present technology relates to the field of machine learning. More particularly, the present technology relates to techniques for scraping URLs based on viewport views.

BACKGROUND

Users often utilize computing devices for a wide variety of purposes. For example, users of a social networking system can use their computing devices to interact with one another, access content, share content, and create content. In interacting with one another, the users can provide, post, or share Uniform Resource Locators (URLs). For instance, URLs can be placed within posts or within comments. The posts or comments can be to pages, to profiles, or to groups. By using URLs, users can draw the attention of other users to resources which can be relevant to a page, profile, or group, but which can exist apart from the page, profile, or group. The resources can include pages, profiles, or groups within the social networking system. The resources can also include webpages on the Internet.

SUMMARY

Various embodiments of the present disclosure can include systems, methods, and non-transitory computer readable media configured to receive a uniform resource locator. A time and one or more features associated with the uniform resource locator can be provided to a first machine learning model. A prediction relating to a quantity of views the uniform resource locator achieves by the time can be received from the first machine learning model.

In an embodiment, a cold start state can be determined to not exist.

In an embodiment, it can be determined that the prediction relating to a quantity of views satisfies a threshold quantity of views. Also, it can be requested that the uniform resource locator be scraped.

In an embodiment, the one or more features can comprise at least one of an identifier, historical data, or one or more tokens.

In an embodiment, training data input comprising an elapsed time and one or more features which correspond to the uniform resource locator can be provided to the first machine learning model. Also, training data output comprising view count data for the uniform resource locator can be provided to the first machine learning model.

In an embodiment, the uniform resource locator can reference one of a page, a profile, a group, or a webpage.

In an embodiment, the first machine learning model can apply Poisson regression.

In an embodiment, a cold start state can be determined to exist. Also, one or more features associated with the uniform resource locator can be provided to a second machine learning model. Further, a second prediction can be received from the second machine learning model. The second prediction can relate to a quantity of views the uniform resource locator achieves before the cold start state ends.

In an embodiment, the cold start state can be associated with the first machine learning model having not yet been sufficiently trained.

In an embodiment, it can be determined that the second prediction satisfies a second threshold quantity of views. Also, it can be requested that the uniform resource locator be scraped.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
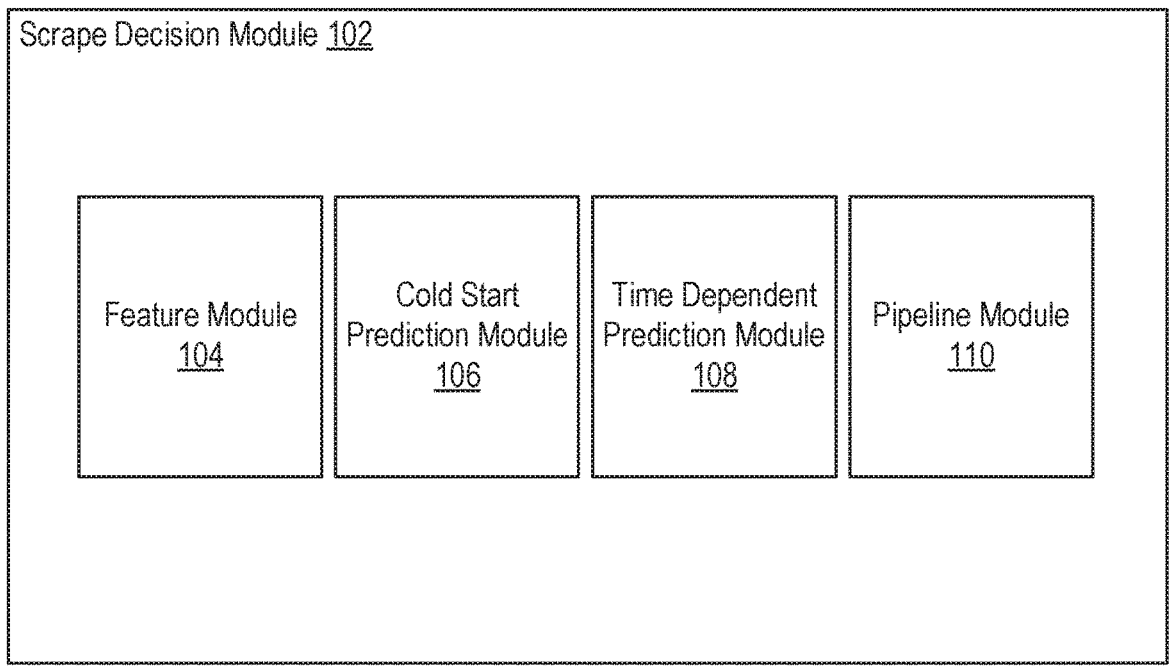
FIG. 1 illustrates an example system including an example scrape decision module, according to an embodiment of the present disclosure.
Figure 1:
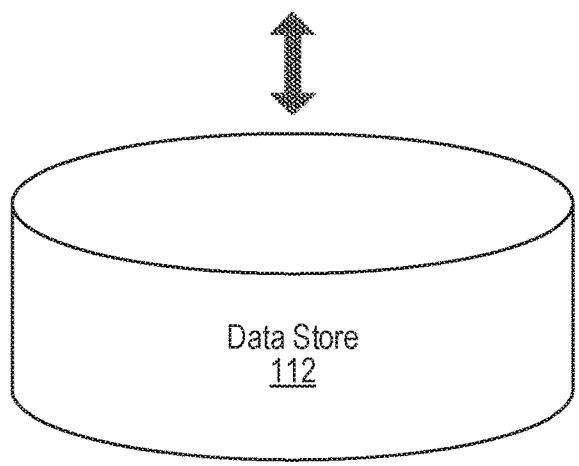

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Scraping URLs Based on Viewport Views

Users often utilize computing devices for a wide variety of purposes. For example, users of a social networking system can use their computing devices to interact with one another, access content, share content, and create content. In interacting with one another, the users can provide, post, or share URLs. For instance, URLs can be placed within posts or within comments. The posts or comments can be to pages, to profiles, or to groups. By using URLs, users can draw the attention of other users to resources which can be relevant to a page, profile, or group, but which can exist apart from the page, profile, or group. The resources can include pages, profiles, or groups within the social networking system. The resources can also include webpages on the Internet.

While a URL in some instances can a reference a resource which can enhance experiences of users within a social networking system, a URL in other instances can also reference objectionable content. To prevent its users from being exposed to objectionable content, the social networking system can scrape URLs which have been introduced to the social networking system. Scraping a URL can allow the social networking system to make a decision as to whether or not the URL references objectionable content. Where a URL is found to reference objectionable content, the social networking system can suppress the URL.

Conventional approaches can, upon introduction of a URL to a social networking system, queue the URL for scraping. However, scraping a URL can be a time consuming process. Moreover, URLs can be introduced to the social networking system frequently and in large quantities. Because of this, the queue can build up a significant backlog of URLs to be scraped. The social networking system can address this backlog according to the order in which the URLs are introduced to the social networking system. This can lead to the social networking system scraping a URL which can be subject to few viewport views before scraping a different URL which can be subject to a large quantity of viewport views. As a result, at a point in time at which a URL is scraped, the URL can have already been seen by a large quantity of users. Where the URL references objectionable content, the large quantity of users can be undesirably subjected to the objectionable content before it is suppressed by the social networking system.

Due to these or other concerns, conventional approaches can be disadvantageous or problematic. Therefore, an improved approach can be beneficial for addressing or alleviating various drawbacks associated with conventional approaches. Based on computer technology, the disclosed technology can utilize machine learning in requesting that URLs introduced to a communication platform, such as a social networking system, be scraped. In some embodiments, a URL can be provided, posted, or shared to the social networking system. A machine learning model can be trained to formulate time dependent predictions for URLs. A time dependent prediction for a URL can be a predicted quantity of viewport views which the URL may achieve by a selected time. The predicted quantity of viewport views can subsequently be compared to a threshold quantity of viewport views. The social networking system can determine a cold start state to exist where the machine learning model has not yet been sufficiently trained. In some embodiments, the social networking system can determine the cold start state to exist where the machine learning model has not yet been trained with at least a selected quantity of viewport view count data for the URL.

A further machine learning model can be trained to formulate cold start predictions for URLs. During the cold start state, the social networking system can use the further machine learning model to formulate a cold start prediction for the URL. The cold start prediction can be whether or not the URL is expected to achieve a threshold quantity of viewport views before the cold start state ends. Where the prediction is "yes," the social networking system can request that the URL be scraped. Where the prediction is "no," the social networking system can wait for the cold start state to end.

When the cold start state ends, the social networking system can formulate a prediction for the URL using the machine learning model which formulates time dependent predictions. In some embodiments, the social networking system may not formulate the prediction where scraping has already been requested during the cold start state. The time dependent prediction can be whether or not the URL is expected to achieve a threshold quantity of viewport views by a selected time in the future. Where the prediction is "yes," the social networking system can request that the URL be scraped. Where the prediction is "no," the social networking system can periodically repeat generating the time dependent prediction for the URL, and checking whether the generated prediction warrants requesting that the URL be scraped.

The social networking system can train the machine learning model which formulates time dependent predictions. The social networking system can train the machine learning model by periodically providing it with training data. For example, the training data can include, as training data input, various features for the URL. As another example, the training data also can include, as training data input, an elapsed time since the provision, posting, or sharing of the URL to the social networking system. As yet another example, the training data also can include, as training data output, a viewport view count for the URL as of the elapsed time.

The social networking system can also train the machine learning model which formulates cold start predictions. The social networking system can train the machine learning model by providing it with training data. For example, the training data can include, as training data input, various features for the URL. As another example, the training data can include, as training data output, an indication of whether or not the URL achieved a threshold quantity of viewport views before the cold start state ended. In this way, the social networking system can train the machine learning model with respect to each of a multitude of URLs which have been introduced to the social networking system. A prediction made by the machine learning model for a given URL can therefore reflect training which the machine learning model has received with respect to a multitude of other URLs. In some embodiments, the machine learning model which formulates cold start predictions and the machine learning model which formulates time dependent predictions can be implemented using a single machine learning model. More details regarding the discussed technology are provided herein.

FIG. 1 illustrates an example system 100 including an example scrape decision module 102. As shown in the example of FIG. 1, the scrape decision module 102 can include a feature module 104, a cold start prediction module 106, a time dependent prediction module 108, and a pipeline module 110. In some instances, the example system 100 can include at least one data store 112. The components (e.g., modules, elements, etc.) shown in this figure and all figures herein are exemplary only, and other implementations can include additional, fewer, integrated, or different components. Some components may not be shown so as not to obscure relevant details. In some embodiments, the scrape decision module 102 can be implemented in a system, such as a social networking system. While the disclosed technology may be described herein in connection with a social networking system for illustrative purposes, the disclosed technology can be implemented in any other type of system or environment.

In some embodiments, the scrape decision module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the scrape decision module 102 can be implemented, in part or in whole, as software running on one or more computing devices or systems. For example, the scrape decision module 102 or at least a portion thereof can be implemented using one or more computing devices or systems that include one or more servers, such as network servers or cloud servers. In another example, the scrape decision module 102 or at least a portion thereof can be implemented as or within an application (e.g., app), a program, an applet, or an operating system, etc., running on a user computing device or a client computing system, such as a user device 610 of FIG. 6. In some instances, the scrape decision module 102 can, in part or in whole, be implemented within or configured to operate in conjunction with a system (or service), such as a social networking system 630 of FIG. 6. It should be understood that there can be many variations or other possibilities.

The scrape decision module 102 can be configured to communicate and/or operate with the at least one data store 112, as shown in the example system 100. The at least one data store 112 can be configured to store and maintain various types of data. For example, the data store 112 can store feature data and view count data. A viewport view can occur for a URL when the URL is visible to a user for at least a threshold period of time through, for example, an interface of a user device of the user. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The feature module 104 can be configured to provide features for a URL. The feature module 104 can receive a URL and provide feature data for the URL. The feature data can include a page, profile, or group identifier in a social networking system for the URL, or a domain for the URL. The feature data can include text tokens for the URL. The text tokens can refer to entities which appear in a landing page of the URL. The entities can be people, places, or things. For instance, "Warriors," "Shakira," and "Syrian Civil War" can be entities. The feature data can include historical data about a page, profile, or group referenced by the URL, or a domain referenced by the URL. The historical data can include viewport view counts. The historical data can also include quantities of URLs that are provided, posted, or shared for the page, profile, or group, or for the domain.

The cold start prediction module 106 can be configured to receive a prediction request for a URL, and reply with a prediction. The prediction can be whether or not the URL is expected to achieve a threshold quantity of viewport views before a cold start state ends. During a cold start state, the cold start prediction module 106 can be used to inform a decision as to whether or not a URL should be scraped. Additional details regarding the cold start prediction module 106 are provided below with reference to FIG. 2.

The time dependent prediction module 108 can be configured to receive a prediction request for a URL, and reply with a prediction. The prediction can be whether or not the URL is expected to achieve a threshold quantity of viewport views by a selected time in the future. Where a cold start state does not exist, the time dependent prediction module 108 can be used to inform a decision as to whether or not a URL should be scraped. In some embodiments, the cold start prediction module 106 and the time dependent prediction module 108 can use the same threshold quantity of viewport views. In other embodiments, the cold start prediction module 106 and the time dependent prediction module 108 can use different threshold quantities of viewport views. Additional details regarding the time dependent prediction module 108 are provided below with reference to FIG. 3.

The pipeline module 110 can be configured to request that a resource referenced by a URL be scraped. The pipeline module 110 can make the request based on predictions generated by the cold start prediction module 106 and the time dependent prediction module 108. The resource can be a page, profile, or group within the social networking system, or a webpage on the Internet, as some examples. The resource can also be a portion of a page, profile, or group within the social networking system, or a portion of a webpage on the Internet. The URL can be one which has been provided, posted, or shared to the social networking system. As examples, the URL can have been placed within a post or within a comment. In certain embodiments, scraping a URL can inform a decision as to whether or not the URL references objectionable content. As examples, objectionable content can include pornography, hate speech, inaccurate information, and the like. Where a URL is found to reference objectionable content, the URL can be suppressed (not displayed) within pages, profiles, groups, search results, or any other interface from which the URL might otherwise be displayed.

The pipeline module 110 can ascertain whether or not the time dependent prediction module 108 has been sufficiently trained. For example, the pipeline module 110 can ascertain whether or not the time dependent prediction module 108 has been sufficiently trained with at least a selected quantity of viewport view count data for the URL. The selected quantity of viewport view count data can be a quantity relevant for a problem being addressed, such as handling objectionable content. The pipeline module 110 can determine a cold start state to exist where the pipeline module 110 finds that the time dependent prediction module 108 has not yet been sufficiently trained.

Having determined the cold start state to exist, the pipeline module 110 can provide a prediction request to the cold start prediction module 106. The prediction request can include the URL. The prediction request can seek a prediction of whether or not the URL is expected to achieve a threshold quantity of viewport views before the cold start state ends. The prediction can indicate a "yes" or a "no." The threshold quantity of viewport views can be a quantity of viewport views which falls within a percentile relevant for a problem being addressed, such as handling objectionable content. As an example, the threshold quantity of viewport views can be 100,000 viewport views. Any other suitable number of viewport views can be used as the threshold quantity of viewport views. In the example where the threshold quantity of viewport views is 100,000 viewport views, the prediction can be expressed as:

$$p(vpv_x > 100 \text{ k}|\text{URL}),$$

where URL can indicate the URL in question, and $vpv_x$ can indicate, for features x for the URL, a predicted viewport view count as of a time the cold start state ends. Features for URLs are discussed in greater detail below.

Where the prediction indicates a "yes," the pipeline module 110 can request that the URL be scraped. Where the prediction indicates a "no," the pipeline module 110 can await the cold start state ending. The pipeline module 110 can await the cold start state ending by periodically ascertaining whether or not the time dependent prediction module 108 has been sufficiently trained. The pipeline module 110 can determine the cold start state to have ended where the pipeline module 110 determines that the time dependent prediction module 108 has become sufficiently trained.

When the cold start state ends, or if the cold start state does not arise in the first place, the pipeline module 110 can provide a prediction request to the time dependent prediction module 108. In some embodiments, the pipeline module 110 may not provide the prediction request where scraping has already been requested during the cold start state. The prediction request can include the URL and a selected time in the future. The prediction request can seek a prediction of whether or not the URL is expected to achieve a threshold quantity of viewport views by the selected time in the future. The prediction can indicate a "yes" or a "no." The threshold quantity of viewport views can be a selected quantity of viewport views that is deemed appropriate to scrape the URL to check for objectionable content. As an example, the threshold quantity of viewport views can be 100,000 viewport views. Any other suitable number of viewport views can be used as the threshold quantity of viewport views. The selected time in the future can, as examples, be five minutes, ten minutes, or any other suitable time duration in the future. In the example where the threshold quantity of viewport views is 100,000 viewport views, the prediction can be expressed as:

$$p(vpv_{(x,t+1)} > 100 \text{ k} | vpv_{(x,t-)}),$$

where $vpv_{(x,t+1)}$ can indicate, for features x for the URL and the time in the future t+1, a predicted viewport view count for the URL as of the time in the future, and $vpv_{(x,t^-)}$ can indicate, for features x for various URLs, previous viewport view counts achieved by the various URLs through a time $t^-$.

Where the prediction indicates a "yes," the pipeline module 110 can request that the URL be scraped. Where the prediction indicates a "no," the pipeline module 110 can periodically re-request that the time dependent prediction module 108 provide a prediction regarding the URL, and check whether the prediction warrants requesting that the URL be scraped.

Figure 2:
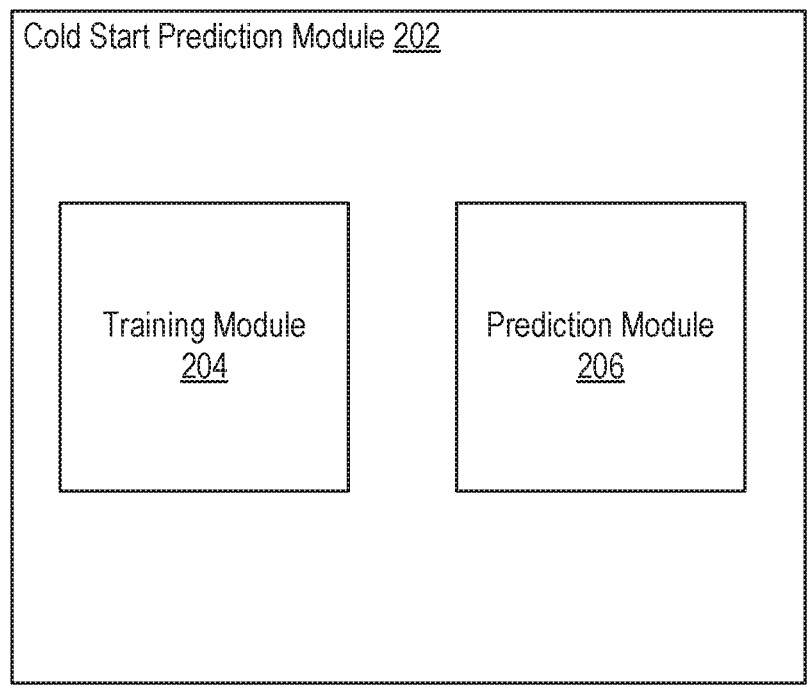
FIG. 2 illustrates an example of a cold start prediction module, according to an embodiment of the present disclosure.

FIG. 2 illustrates an example cold start prediction module 202, according to an embodiment of the present disclosure. In some embodiments, the cold start prediction module 106 of FIG. 1 can be implemented as the example cold start prediction module 202. As shown in FIG. 2, the cold start prediction module 202 can include a training module 204 and a prediction module 206.

The training module 204 can train a machine learning model to predict whether a URL will achieve a threshold quantity of viewport views before a cold start state ends. The training module 204 can train the machine learning model based on training data. An instance of training data can include, as training data input, feature data for a URL. The instance of training data can include, as training data output, an indication of whether or not the URL achieved a threshold quantity of viewport views before a cold start state ended. The machine learning model can apply any generally known approach for classification.

For example, the training module 204 can train the machine learning model based on URLs and indications of whether or not each URL achieved a threshold quantity of viewport views before a cold start state ended. In one implementation, the threshold quantity of viewport views can be 100,000 viewport views. An indication of whether or not a URL achieved the threshold quantity of viewport views before the cold start state ended can be a "yes" or a "no." The training module 204 can provide the URL to the feature module 104, and receive in return feature data for the URL. The training module 204 can provide the feature data as training data input to the machine learning model. In one implementation, where the indication is a "yes," the training module 204 can provide a 1 as training data output to the machine learning model. In this implementation, where the indication is a "no," the training module 204 can provide a 0 as training data output to the machine learning model. Many variations are possible.

A cold start state can be determined to exist with respect to a URL that has been introduced to the social networking system, and which is being considered for scraping. In some embodiments, when the cold start state ends, the training module 204 can further train (or retrain) the machine learning model based on the URL. The training can include providing to the machine learning model an indication of whether or not the URL achieved a threshold quantity of viewport views before the cold start state ended.

The prediction module 206 can be configured to respond to a prediction request received from the pipeline module 110. The prediction request can include a URL. The prediction module 206 can provide the URL to the feature module 104, and receive in return feature data for the URL. The prediction module 206 can provide the feature data as input to the trained machine learning model. The prediction module 206 can receive from the machine learning model an output that is a prediction of whether or not a threshold quantity of viewport views is expected to be achieved by the URL before a cold start state ends. As an example, the threshold quantity of viewport views can be 100,000 viewport views. In some embodiments, the output can be a value between 0 and 1. As just one example, where the prediction module 206 receives from the machine learning model a value which is greater than 0.5, the prediction module 206 can return a "yes" to the pipeline module 110. In this example, where the prediction module 206 receives from the machine learning model a value which is less than 0.5, the prediction module 206 can return a "no" to the pipeline module 110.

Figure 3:
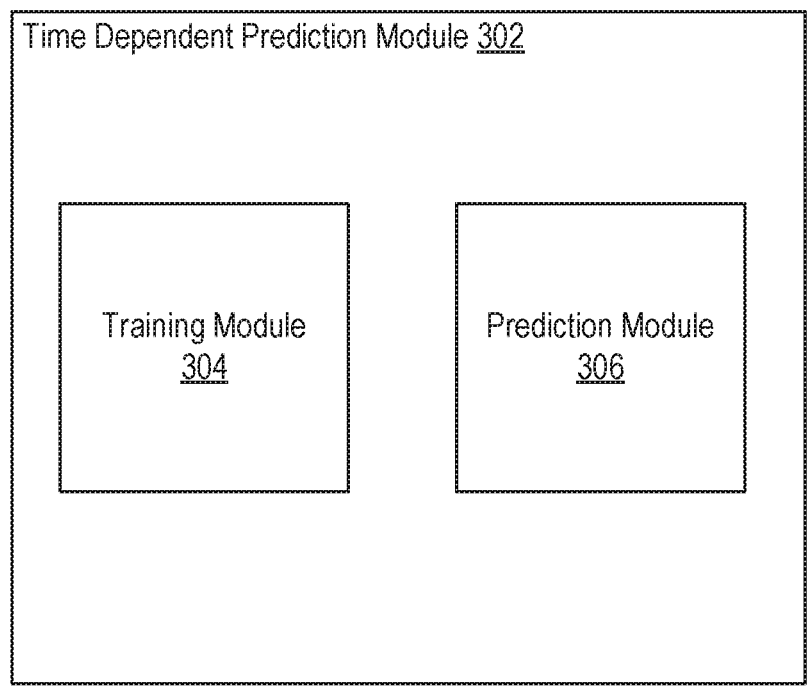
FIG. 3 illustrates an example of a time dependent prediction module, according to an embodiment of the present disclosure.

FIG. 3 illustrates an example time dependent prediction module 302, according to an embodiment of the present disclosure. In some embodiments, the time dependent prediction module 108 of FIG. 1 can be implemented as the example time dependent prediction module 302. As shown in FIG. 3, the time dependent prediction module 302 can include a training module 304 and a prediction module 306.

The training module 304 can train a machine learning model to predict whether a URL will achieve a threshold quantity of viewport views by a selected time in the future. The training module 304 can train the machine learning model based on training data. An instance of training data can include, as training data input, feature data for a URL and a time. The instance of training data can include, as training data output, a viewport view count for the URL as of the time. The machine learning model can apply any generally known approach for regression including, for example, a Poisson regression approach.

For example, the training module 304 can train the machine learning model based on URLs and information which corresponds to those URLs. For a given URL, the corresponding information can include an elapsed time since a provision, posting, or sharing of the URL to the social networking system. The information for a given URL can also include a viewport view count for the URL as of the elapsed time. The training module 304 can provide the URL to the feature module 104, and receive in return feature data for the URL. The training module 304 can provide the feature data as training data input to the machine learning model. The training module 304 can also provide the elapsed time as training data input to the machine learning model. The training module 304 can provide the viewport view count for the URL as of the elapsed time as training data output to the machine learning model.

The prediction module 306 can be configured to respond to a prediction request received from the pipeline module 110. The prediction request can include a URL and a time in the future. The time in the future can be specified in terms of an elapsed time since a provision, posting, or sharing of the URL to the social networking system. The prediction module 306 can provide the URL to the feature module 104, and receive in return feature data for the URL. The prediction module 306 can provide the feature data and the time in the future as input to the machine learning model.

The prediction module 306 can receive from the machine learning model an output that is a prediction of a quantity of viewport views which the URL may achieve by the time in the future. The prediction module 306 can compare the quantity of viewport views to a threshold quantity of viewport views. As an example, the threshold quantity of viewport views can be 100,000 viewport views. Where the comparison finds the threshold to be met, the prediction module 306 can return a "yes" to the pipeline module 110. Where the comparison finds the threshold to not be met, the prediction module 306 can return a "no" to the pipeline module 110. Many variations are possible.

In certain embodiments, the prediction module 306 can be configured to receive a speed prediction request from the pipeline module 110. The speed prediction request can include a URL, a viewport view speed, and a time in the future. The speed prediction request can seek a prediction as to whether or not the URL will achieve the viewport view speed between a current time and the time in the future. The time in the future can be specified in terms of an elapsed time since a provision, posting, or sharing of the URL to the social networking system. Likewise, the prediction module 306 can define the current time in terms of an elapsed time since a provision, posting, or sharing of the URL to the social networking system. The prediction module 306 can provide the URL to the feature module 104, and receive in return feature data for the URL.

The prediction module 306 can provide the feature data and the time in the future to the machine learning model. The prediction module 306 can receive from the machine learning model an output that is a prediction of a quantity of viewport views which the URL may achieve by the time in the future.

The prediction module 306 can calculate a slope:

$$\frac{VPV_f - VPV_c}{t_f - t_c},$$

where $VPV_f$ can be the prediction received from the machine learning model, $VPV_c$ can be a current viewport view count for the URL, $t_f$ can be the time in the future, and $t_c$ can be the current time.

The prediction module 306 can compare the slope to the viewport view speed. Where the comparison finds the slope to be greater than or equal to the viewport view speed, the prediction module 306 can return a "yes" to the pipeline module 110. Where the comparison finds the slope to not be greater than or equal to the viewport view speed, the prediction module 306 can return a "no" to the pipeline module 110. The foregoing are merely illustrations and many variations are possible.

Figure 4:
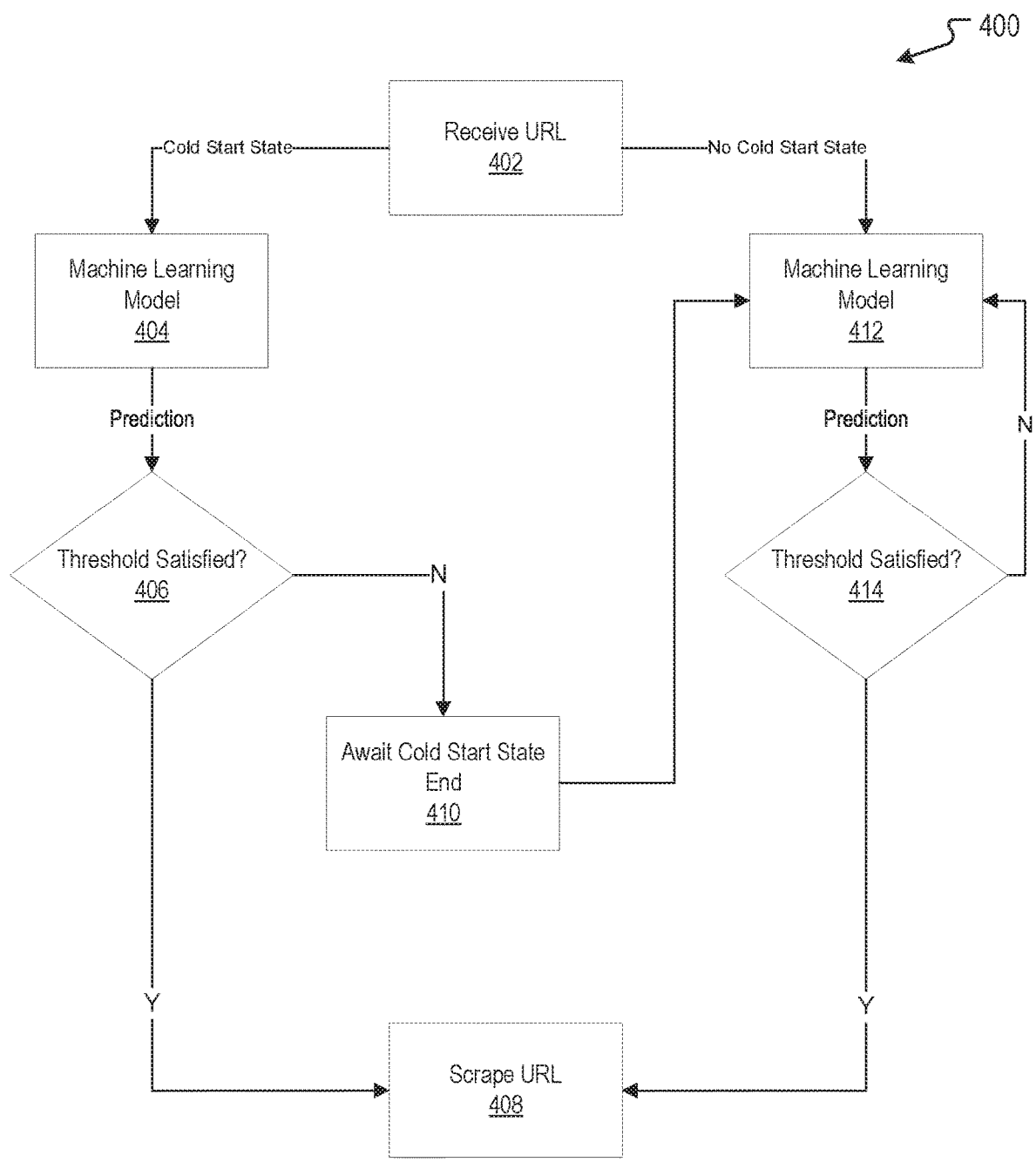
FIG. 4 illustrates an example functional block diagram, according to an embodiment of the present disclosure.

FIG. 4 illustrates an example functional block diagram 400, according to an embodiment of the present disclosure. The example functional block diagram 400 illustrates a flow associated with scraping of URLs based on viewport views, according to an embodiment of the present disclosure.

At block 402, a URL can be provided, posted, or shared to a social networking system. The URL can reference a resource within the social networking system or on the Internet. A cold start state can be determined to exist with respect to the URL. A cold start state can be determined to exist when a first machine learning model that provides a prediction relating to a count of viewport views achieved by the URL by a specified time has not been sufficiently trained. When the cold start state is determined to exist, feature data associated with the URL can be obtained for provision to a second machine learning model that provides a prediction about whether the URL will achieve a threshold quantity of viewport views before a cold start state ends. The feature data associated with URL can include, as examples, an identifier for the URL, a domain for the URL, text tokens for the URL, historical data about the resource referenced by the URL, and/or historical data about a domain referenced by the URL.

At block 404, the feature data associated with the URL can be provided to the second machine learning model. The second machine learning model can be trained and retrained with various training data, as discussed in connection with the cold start prediction module 106. At block 406, if the prediction about whether the URL will achieve a threshold quantity of viewport views indicates that the URL will achieve the threshold quantity, a request can be made to scrape the URL at block 408. If the prediction about whether the URL will achieve a threshold quantity of viewport views does not indicate that the URL will achieve the threshold quantity, an end to the cold start state can be awaited at block 410.

When the cold start state ends, or if the cold start state does not arise in the first place, feature data associated with the URL can be obtained for provision to the first machine learning model. The first machine learning model can provide a prediction relating to a count of viewport views achieved by the URL by a specified time. The feature data associated with URL can include, as examples, an identifier for the URL, a domain for the URL, text tokens for the URL, historical data about the resource referenced by the URL, and/or historical data about a domain referenced by the URL. At block 412, the feature data associated with the URL can be provided to the first machine learning model. Also provided to the first machine learning model can be a specified time in the future. The first machine learning model can be trained and retrained with various training data, as discussed in connection with the time dependent prediction module 108.

At block 414, if the prediction provided by the first machine learning model indicates that the URL will achieve a threshold quantity of viewport views by the specified time, a request can be made to scrape the URL at block 408. If the prediction does not indicate that the URL will achieve the threshold quantity of viewport views by the specified time, the feature data associated with the URL, and a specified time increasingly further in the future, can be periodically provided to the second machine learning model. This can serve to monitor whether the URL will later achieve the threshold quantity of viewport views. While the foregoing has been provided as an illustration, many variations are possible in accordance with the present technology.

Figure 5:
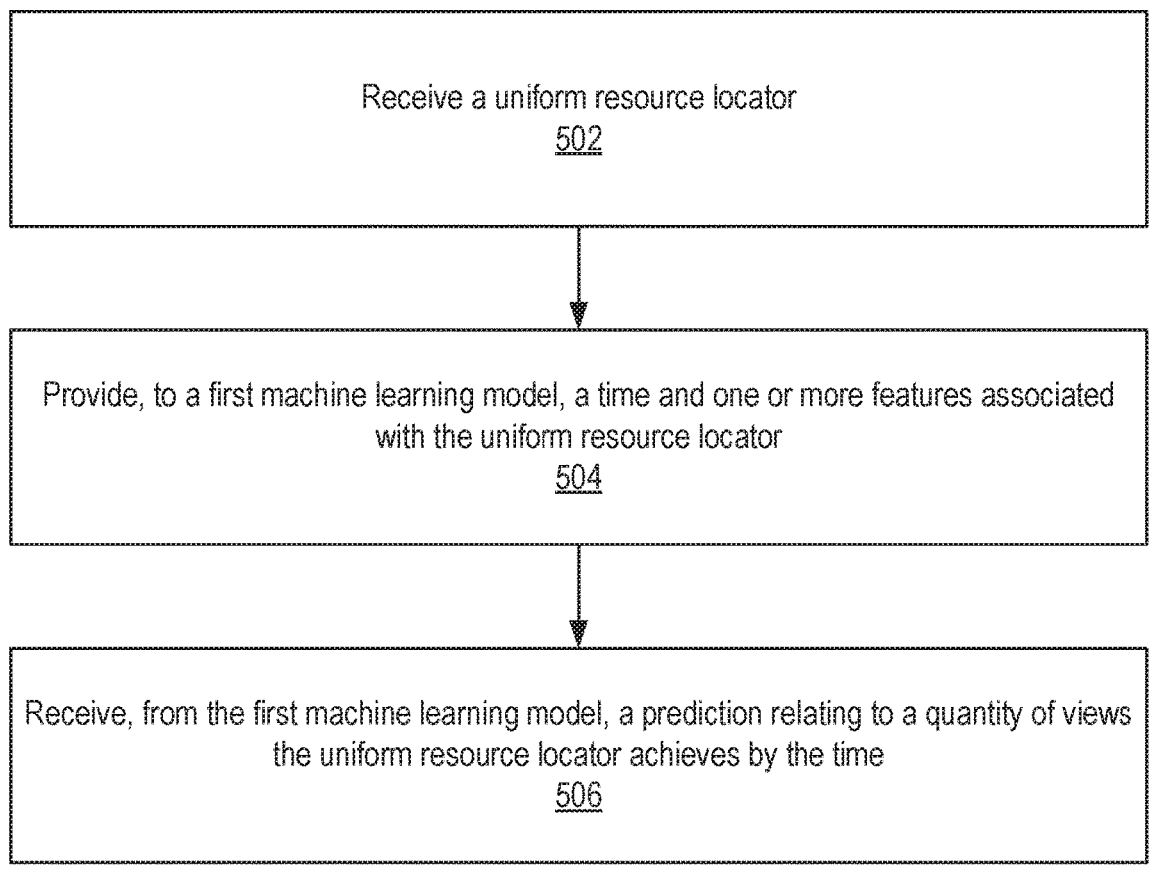
FIG. 5 illustrates an example process, according to an embodiment of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can receive a uniform resource locator. At block 504 the process can provide, to a first machine learning model, a time and one or more features associated with the uniform resource locator. Then, at block 506, the process can receive, from the first machine learning model, a prediction relating to a quantity of views the uniform resource locator achieves by the time.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
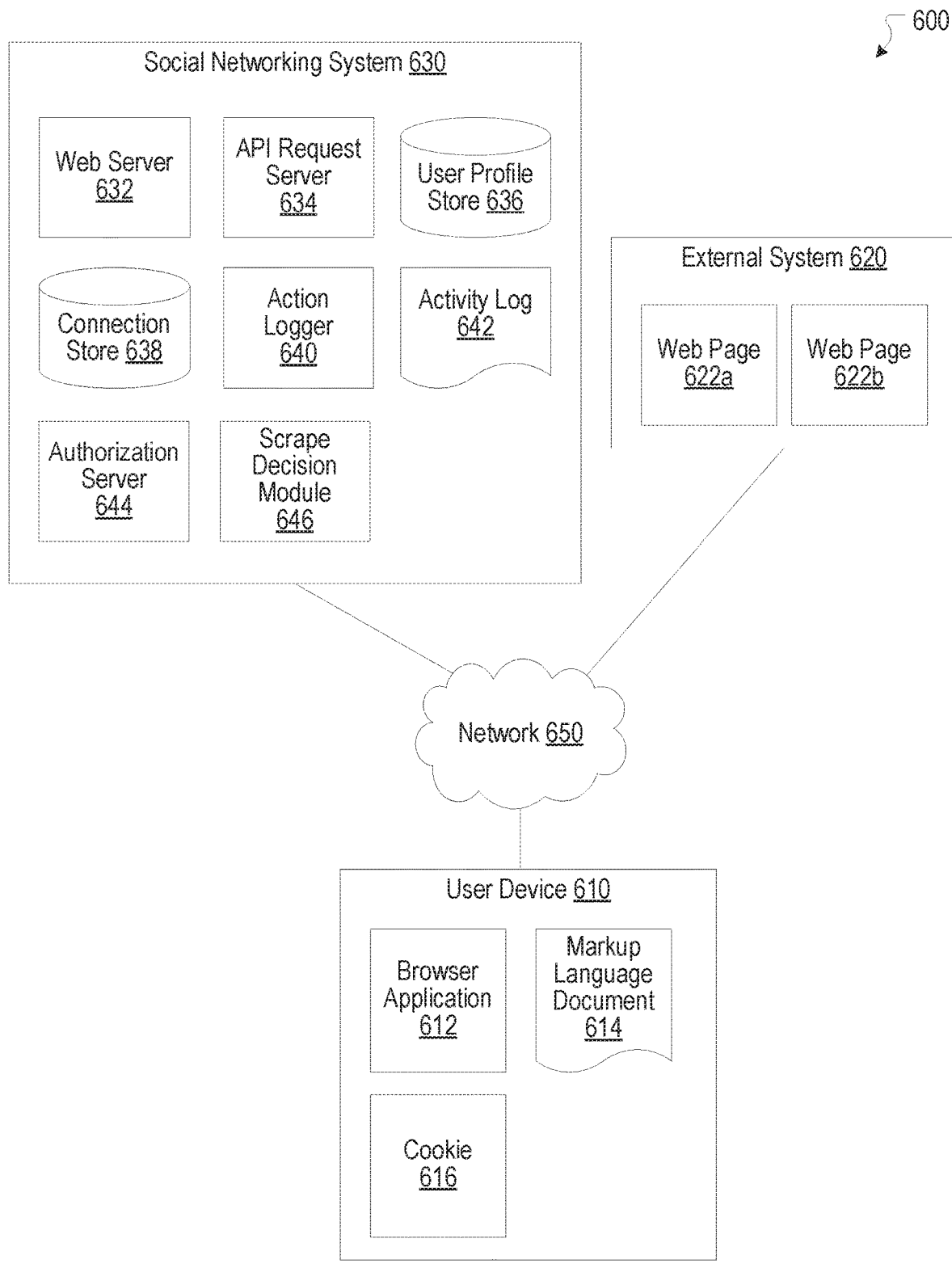
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a scrape decision module 646. The scrape decision module 646 can, for example, be implemented as the scrape decision module 102 of FIG. 1. As discussed previously, it should be appreciated that there can be many variations or other possibilities.

Hardware Implementation

Figure 7:
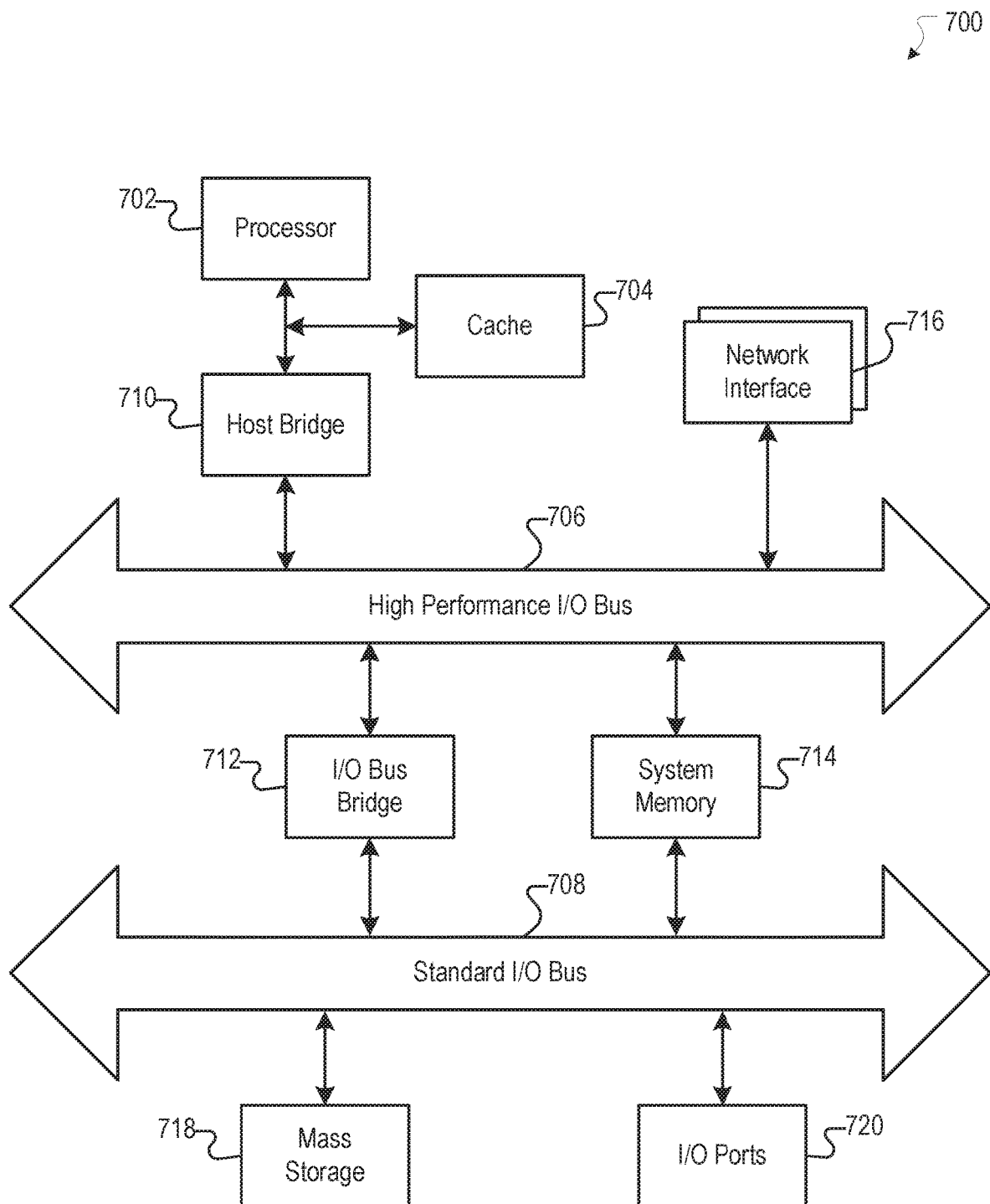
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a uniform resource locator;
    determining, by the computing system, a predicted time of when a cold start state for a first machine learning model will end based on a quantity of training views associated with the uniform resource locator;
    providing, by the computing system, to the first machine learning model, a time and one or more features associated with the uniform resource locator based on the predicted time, wherein the one or more features include historical data associated with a domain referenced by the uniform resource locator; and
    receiving, by the computing system, from the first machine learning model, a prediction relating to a quantity of views the uniform resource locator achieves by the time.

2. The computer-implemented method of claim 1, further comprising:
    determining, by the computing system, the cold start state to have ended based on the quantity of training views satisfying a threshold quantity of training views.

3. The computer-implemented method of claim 1, further comprising:
    determining, by the computing system, that the prediction relating to a quantity of views satisfies a threshold quantity of views; and
    requesting, by the computing system, that the uniform resource locator be scraped.

4. The computer-implemented method of claim 1, wherein the one or more features comprise at least one of: an identifier or one or more tokens.

5. The computer-implemented method of claim 1, further comprising:
    providing, by the computing system, to the first machine learning model, training data input comprising an elapsed time and one or more features which correspond to the uniform resource locator; and
    providing, by the computing system, to the first machine learning model, training data output comprising view count data for the uniform resource locator.

6. The computer-implemented method of claim 1, wherein the uniform resource locator references at least one of: a page, a profile, a group, or a webpage.

7. The computer-implemented method of claim 1, wherein the first machine learning model applies Poisson regression.

8. The computer-implemented method of claim 1, further comprising:
    providing, by the computing system, to a second machine learning model, one or more features associated with the uniform resource locator; and
    receiving, by the computing system, from the second machine learning model, a second prediction, wherein the second prediction relates to a quantity of views the uniform resource locator achieves before the cold start state ends.

9. The computer-implemented method of claim 1, wherein the cold start state is associated with the first machine learning model having not yet been trained with a threshold quantity of training views and the predicted time is associated with when the first machine learning model will be trained with the threshold quantity of training views.

10. The computer-implemented method of claim 8, further comprising:
    determining, by the computing system, that the second prediction satisfies a second threshold quantity of views; and
    requesting, by the computing system, that the uniform resource locator be scraped.

11. A computer-implemented system comprising:
    at least one processor; and
    a memory storing instructions that, when executed by the at least one processor, cause the system to perform:
        receiving a uniform resource locator;
        determining a predicted time of when a cold start state for a first machine learning model will end based on a quantity of training views associated with the uniform resource locator;
        providing, to the first machine learning model, a time and one or more features associated with the uniform resource locator based on the predicted time, wherein the one or more features include historical data associated with a domain referenced by the uniform resource locator; and
        receiving, from the first machine learning model, a prediction relating to a quantity of views the uniform resource locator achieves by the time.

12. The system of claim 11, wherein the instructions, when executed by the at least one processor, further cause the system to perform:
    determining that the prediction relating to a quantity of views satisfies a threshold quantity of views; and
    requesting that the uniform resource locator be scraped.

13. The system of claim 11, wherein the instructions, when executed by the at least one processor, further cause the system to perform:
    providing, to a second machine learning model, one or more features associated with the uniform resource locator; and
    receiving, from the second machine learning model, a second prediction, wherein the second prediction relates to a quantity of views the uniform resource locator achieves before the cold start state ends.

14. The system of claim 11, wherein the cold start state is associated with the first machine learning model having not yet been trained with a threshold quantity of training views and the predicted time is associated with when the first machine learning model will be trained with the threshold quantity of training views.

15. The system of claim 13, wherein the instructions, when executed by the at least one processor, further cause the system to perform:

determining that the second prediction satisfies a second threshold quantity of views; and requesting that the uniform resource locator be scraped.

16. A non-transitory computer-readable storage medium including instructions that, when executed by at least one processor of a computing system, cause the computing system to perform a method comprising:

receiving a uniform resource locator;

determining a predicted time of when a cold start state for a first machine learning model will end based on a quantity of training views associated with the uniform resource locator;

providing, to the first machine learning model, a time and one or more features associated with the uniform resource locator based on the predicted time, wherein the one or more features include historical data associated with a domain referenced by the uniform resource locator; and receiving, from the first machine learning model, a prediction relating to a quantity of views the uniform resource locator achieves by the time.

17. The non-transitory computer-readable storage medium of claim 16, wherein the instructions, when executed by the at least one processor of the computing system, further cause the computing system to perform:

determining that the prediction relating to a quantity of views satisfies a threshold quantity of views; and requesting that the uniform resource locator be scraped.

18. The non-transitory computer-readable storage medium of claim 16, wherein the instructions, when executed by the at least one processor of the computing system, further cause the computing system to perform:

providing, to a second machine learning model, one or more features associated with the uniform resource locator; and receiving, from the second machine learning model, a second prediction, wherein the second prediction relates to a quantity of views the uniform resource locator achieves before the cold start state ends.

19. The non-transitory computer-readable storage medium of claim 18, wherein the cold start state is associated with the first machine learning model having not yet been trained with a threshold quantity of training views and the predicted time is associated with when the first machine learning model will be trained with the threshold quantity of training views.

20. The non-transitory computer-readable storage medium of claim 18, wherein the instructions, when executed by the at least one processor of the computing system, further cause the computing system to perform:

determining that the second prediction satisfies a second threshold quantity of views; and requesting that the uniform resource locator be scraped.

\* \* \* \* \*